(12) United States Patent
Trouboul

(10) Patent No.: US 11,163,142 B2
(45) Date of Patent: Nov. 2, 2021

(54) ONE-PIECE OPTICAL ELEMENT WITH DIAPHRAGM

(71) Applicant: IDEMIA IDENTITY & SECURITY FRANCE, Courbevoie (FR)

(72) Inventor: Laurent Trouboul, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 16/268,285

(22) Filed: Feb. 5, 2019

(65) Prior Publication Data
US 2019/0243113 A1 Aug. 8, 2019

(30) Foreign Application Priority Data
Feb. 7, 2018 (FR) ........................................ 1851010

(51) Int. Cl.
*G06K 9/00* (2006.01)
*G02B 17/08* (2006.01)
*G02B 5/00* (2006.01)
*G02B 27/58* (2006.01)
*G02B 5/18* (2006.01)

(52) U.S. Cl.
CPC ........... *G02B 17/086* (2013.01); *G02B 5/005* (2013.01); *G02B 5/1857* (2013.01); *G02B 27/58* (2013.01); *G06K 9/0004* (2013.01); *G06K 9/00046* (2013.01)

(58) Field of Classification Search
CPC .... G02B 17/086; G02B 27/58; G02B 5/1857; G02B 5/005; G06K 9/00046; G06K 9/0004; G06K 9/00–0012
See application file for complete search history.

(56) References Cited

U.S. PATENT DOCUMENTS

| 5,974,162 A * | 10/1999 | Metz ................... G06K 7/1098 382/124 |
| 7,969,654 B1 | 6/2011 | Ersoy et al. |
| 2003/0152120 A1* | 8/2003 | Ledentsov .......... H01S 5/18341 372/45.01 |
| 2004/0208348 A1* | 10/2004 | Baharav ............. G06K 9/00026 382/124 |
| 2004/0247906 A1 | 12/2004 | Gasloli |

(Continued)

OTHER PUBLICATIONS

Preliminary Research Report received for French Application No. 1851010, dated Sep. 20, 2018, 3 pages (1 page of French Translation Cover Sheet and 2 pages of original document).

*Primary Examiner* — Roberto W Flores
(74) *Attorney, Agent, or Firm* — Womble Bond Dickinson (US) LLP

(57) ABSTRACT

A one-piece optical element (1) consisting of a material transparent to light, comprising a diaphragm (5) formed in the mass of said transparent material, the diaphragm (5) comprising an orifice consisting of said transparent material, suitable for the passage of light through said orifice, and a screen consisting of said transparent material surrounding said orifice (6), said screen opposing the passage of light therethrough and being formed by a succession of modified layers formed of the transparent material, separated from each other, and having a modified refractive index different from the refractive index of the transparent material in the rest of the optical element.

9 Claims, 2 Drawing Sheets

(56) References Cited

U.S. PATENT DOCUMENTS

| | | | |
|---|---|---|---|
| 2010/0270277 A1* | 10/2010 | Matsumoto | B23K 26/06 219/121.72 |
| 2011/0134040 A1* | 6/2011 | Duparre | G06F 3/03543 345/166 |
| 2012/0026093 A1* | 2/2012 | Duparre | G06F 3/0425 345/166 |
| 2012/0169672 A1* | 7/2012 | Christiansson | G06F 3/0421 345/175 |
| 2014/0056558 A1* | 2/2014 | Hirono | G02B 6/25 385/33 |

* cited by examiner

ONE-PIECE OPTICAL ELEMENT WITH DIAPHRAGM

CONTEXT AND TECHNOLOGICAL BACKGROUND

The present invention belongs to the field of optics, and more specifically relates to a one-piece optical element comprising a diaphragm, preferably incorporated in a fingerprint sensor.

The field of biometrics often uses optical systems in order to acquire the biometric data that has to be processed. This is particularly the case for fingerprint sensors, which must illuminate a finger and recover the light therefrom for processing it.

Figure 1:
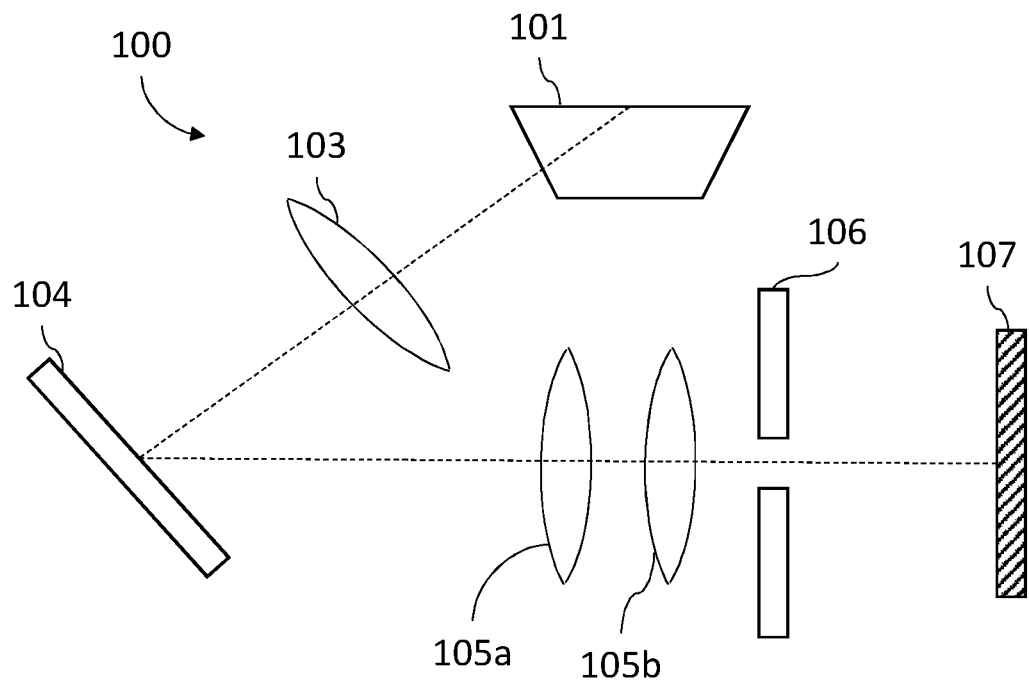

FIG. 1 depicts an example of an optical system 100 used in a fingerprint sensor. Such an optical system comprises a plurality of distinct elements. A prism 101 is used for receiving at its surface the finger whereof the fingerprints have to be acquired. The light resulting from the interaction between the finger and the prism 101 passes into a first lens 103, then is reflected by a mirror 104. The light passes through two lenses 105a and 105b, then through the pupil of a diaphragm 106 before reaching an imager 107.

As can be seen, the light is passed through a plurality of elements of the optical system 100. However, each of its element acts on the light according not only to its structure, but also to its arrangement in the light path. Any deviation of a characteristic of an element irreversibly degrades the quality of the light beam. For example, a simple mismatch between the lenses 105a and 105b may reduce the performance of the sensor by nearly 40%.

It is therefore necessary to ensure that each of the elements meets strict manufacturing requirements, and that these elements are precisely arranged during the assembly of the system. These constraints make the manufacture of such sensors complex and expensive.

The creation of an optical element fulfilling the functions of a plurality of these elements has so far come up against multiple obstacles that made it preferable to continue to use distinct optical elements. In particular, the presence of a diaphragm in such an optical element presented difficulties in implementation deterring the person skilled in the art from considering it.

DESCRIPTION OF THE INVENTION

The invention aims to at least partially overcome these drawbacks, and preferably all of them, and notably aims to provide a one-piece optical element comprising an aperture diaphragm formed in the mass of the material making it possible to control the angle of the light rays passing through it, without altering them, which is simple and inexpensive to manufacture.

To this end, a one-piece optical element is provided consisting of a material transparent to light, said optical element comprising a diaphragm formed in the mass of said transparent material, the diaphragm comprising:
  an orifice consisting of said transparent material, suitable for the passage of light through said orifice,
  a screen consisting of said transparent material surrounding said orifice, said screen opposing the passage of light therethrough and being formed by a succession of modified layers formed of the transparent material, separated from each other, and having a modified refractive index different from the refractive index of the transparent material in the rest of the optical element.

The optical element is advantageously completed by the following features, taken singly or in any of their technically possible combinations:
  the succession of modified layers comprises at least four modified layers, preferably at least ten modified layers;
  the modified layers are separated by a distance of between 10 nm and 200 nm;
  the modified layers separated from each other constitute a Bragg mirror;
  the orifice defines an entrance pupil with a diameter of between 0.5 mm and 2 mm;
  the modified layers extend from the orifice;
  the modified layers extend up to a surface of the optical element;
  the optical element also comprises at least one reflective face.

The invention also relates to a fingerprint sensor comprising:
  a light source suitable for emitting light,
  an acquisition surface configured for receiving a finger,
  an imager configured for acquiring an image,
  the fingerprint sensor comprises an optical element according to the invention, said optical element being arranged between the acquisition surface and the imager, so that the light originating from the acquisition surface and arriving on the imager passes through the diaphragm of the optical element.

The invention also relates to a method for manufacturing an optical device according to the invention, comprising:
  providing a block of material transparent to light,
  manufacturing the diaphragm by a femtosecond laser beam scanning the transparent material at the locations of the modified layers, thereby modifying the refractive index of the transparent material into the modified index.

DESCRIPTION OF THE FIGS.

Figure 2:
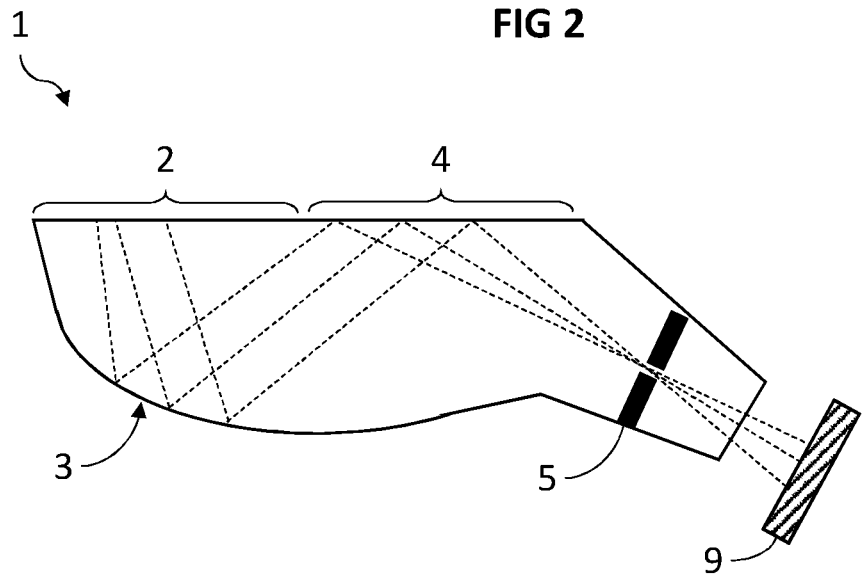
Figure 3:
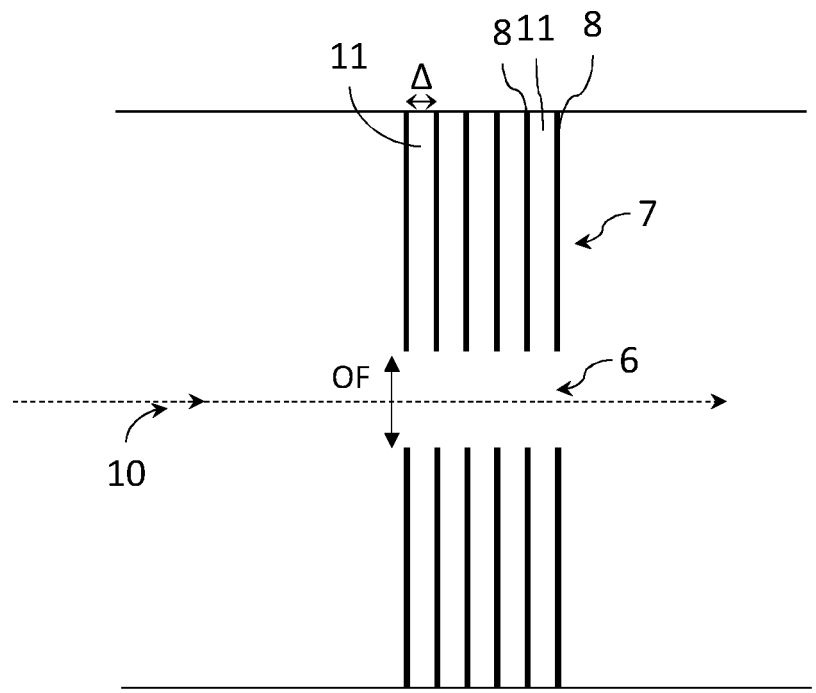
Figure 4:
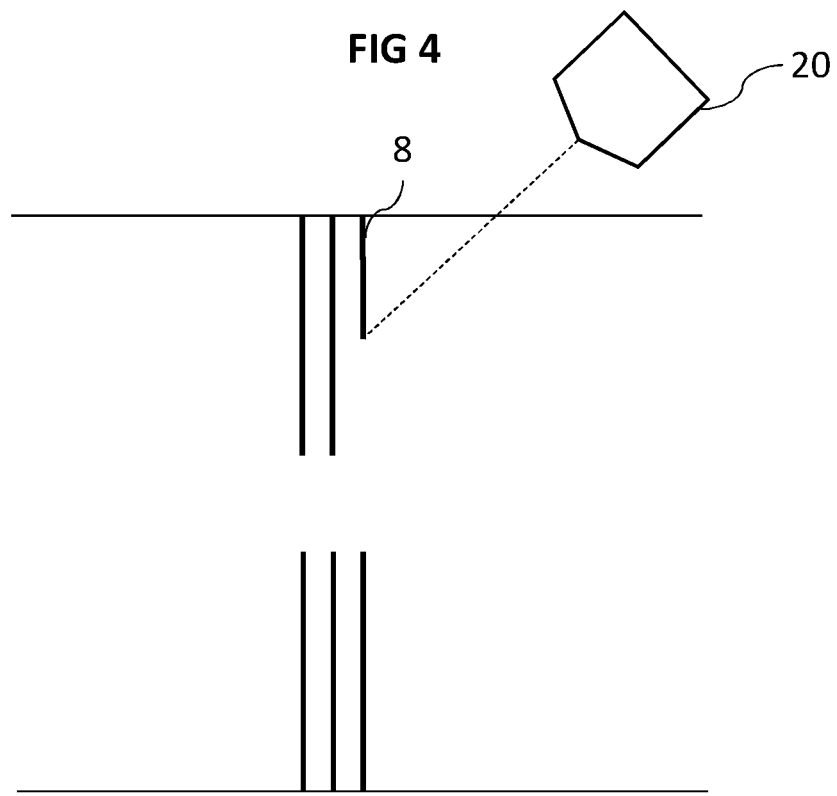

The invention will be better understood thanks to the description below, which relates to preferred embodiments and variants according to the present invention, given by way of non-restrictive examples and explained with reference to the appended schematic drawings, in which:

FIG. 1, already discussed, schematically illustrates an optical system with a plurality of distinct elements used in a fingerprint sensor, representative of the prior art;

FIG. 2 schematically illustrates a sectional view of a one-piece optical element according to a possible embodiment of the invention;

FIG. 3 schematically illustrates a sectional enlargement of the diaphragm of a one-piece optical element according to a possible embodiment of the invention;

FIG. 4 schematically illustrates an instant of the manufacture of the diaphragm in FIG. 3.

DETAILED DESCRIPTION

With reference to FIG. 2, a one-piece optical element 1 is composed of a transparent material, allowing the passage of light. The transparent material may be any transparent material whereof the refractive index is capable of being modified locally by a laser pulse of very short duration, typically between 1 femtosecond ($10^{-15}$ s) and $5\times10^{-13}$ s, i.e. by a femtosecond laser. For example, the transparent material may be made of plastic, such as polymethylmethacrylate (PMMA). The transparent material may also be made of glass, a crystal, or even a transparent ceramic. It is also possible that the transparent material, notably in the case of plastic, contains additives in order to modify its optical properties, and notably its response to a femtosecond laser pulse.

The one-piece optical element 1 is composed of a block of transparent material, having different surfaces at the interface with the external environment. These surfaces may be configured or formed for fulfilling different functions. Thus, in the case of a one-piece optical element 1 in a fingerprint sensor, it is possible to provide an acquisition surface 2 configured for receiving the finger whereof it is desired to acquire the image. A first reflecting surface 3 may, for example, be provided for reflecting the light rays, notably originating from the acquisition surface. This first reflecting surface 3 may be formed so that these light rays are reflected toward a second reflecting surface 4, itself formed for reflecting these rays toward a diaphragm 5.

It is possible that the reflections occurring on the reflecting surfaces 3, 4 are total internal reflections resulting from the fact that the light rays have angles of incidence on these reflecting surfaces 3, 4 greater than the critical angles defined by the refractive index of the transparent material and the external face of these surfaces, typically air or a material deposited on this external face and chosen so that its refractive index causes these total internal reflections. It is also possible that the reflections occurring on the reflecting surfaces 3, 4 result from the presence of a reflective material, such as a metal layer, deposited on the external face of a reflecting surface.

In the illustrated example, the first reflecting surface 3 is provided with a reflective material on its external face, while the reflections on the second reflecting surface 4 result from total internal reflections. The first reflecting surface 3 thus has a shape by which the light rays reflected toward the second reflecting surface 4 have a reflection allowing them to be reflected to the diaphragm 5 by taking into account the flat aspect of this second reflecting surface 4. It is easy to determine the appropriate shape of this first reflecting surface 3 by means of optical simulation software.

It is well understood that the optical element 1 could have a quite different shape, with more or less reflecting surfaces, or even none, according to various modalities. However, for reasons of compactness and arrangement in a sensor, the optical element 1 preferably has at least one reflecting surface configured for reflecting into the optical element 1 the light rays being propagated in the optical element 1 on expected light paths.

In all cases, the optical element 1 comprises a diaphragm 5 formed in the mass of the transparent material constituting the one-piece optical element 1. As can be seen in FIG. 3, the diaphragm 5 comprises an orifice 6 suitable for the passage of light through said orifice 6 in a propagation direction 10. The diaphragm 5 also comprises a screen 7 opposing the passage of light therethrough in the propagation direction 10. The screen 7 surrounds the orifice 6. Both the orifice 6 and the screen 7 are composed of the transparent material constituting the optical element 1. However, the screen 7 is formed by a succession of modified layers 8 of the transparent material. These modified layers 8 have a modified refractive index different from the refractive index of the transparent material in the rest of the optical element 1.

The orifice 6 defines an entrance pupil and has a diameter OF, i.e. a larger dimension, transverse to the propagation direction 10, e.g. between 0.5 mm and 2 mm, typically 0.8 mm. The diameter OF of the orifice 6 is chosen according to geometrical considerations including the shape of the optical element 1, the distance provided between the orifice 6 and the imager 9 receiving the light rays, and/or by taking into account the wavelength of the light rays. The orifice 6 preferably has a circular cross section, but its cross section may have another shape.

The modified layers 8 extend from the orifice 6, and preferably up to a surface of the optical element 1. Thus, the diaphragm 5 preferably blocks the entire light path through the optical element 1 where the diaphragm 5 is located, preventing the propagation of the light rays in the propagation direction 10.

The modified layers 8 alternate with intercalary spaces 11 of the unmodified or differently modified, transparent material, these intercalary spaces 11 separating the modified layers 8 from each other. The modified layers 8 are separated from each other by a distance Δ. As the modified layers 8 have a modified refractive index $n_2$ different from the refractive index $n_1$ of the transparent material constituting the intercalary spaces 11, the distance Δ is chosen so as to create constructive interference in the incidence direction of the light rays, i.e. in the opposite direction to the propagation direction. A Bragg mirror is thus obtained.

Thus, the distance Δ is chosen so as to approach, preferably with less than 10% inaccuracy, the optimum distance $Δ_B$:

$$Δ_B = \frac{\lambda}{4 \times n}$$

with λ the wavelength of the light rays the passage of which is to be blocked by the diaphragm, and n the refractive index, in this case that of the transparent medium constituting the intercalary spaces 11 between the modified layers 8. By way of example, with a PMMA with a refractive index $n_1$ of 1.51 and for a wavelength of 650 nm, the optimum distance $Δ_B$ is approximately 108 nm. A distance Δ of 110 nm may then be taken, for example. Preferably, the distance Δ is between 50 nm and 200 nm, and preferably between 70 nm and 140 nm.

Ideally, each modified layer 8 should have a similarly determined thickness close to the optimum distance $Δ_B$, by taking into account the different modified refractive index $n_2$ resulting from the modification. However, it may be difficult, according to the method of manufacturing the modified layers 8, to achieve a sufficient thickness or sufficiently accurate dimension for these. However, these are the interfaces between the layers of different refractive indices which give rise to the Bragg diffraction. It is therefore not necessary for the modified layers 8 to have a particular thickness since their presence alone defines the interfaces between different refractive indices. Consequently, the thickness of the modified layers 8 may be any thickness, but is preferably as thin as the manufacturing process allows, in order to minimize the spatial extent of the diaphragm in the propagation direction 10.

Indeed, the capacity of the screen 7 to oppose the passage of light therethrough essentially depends, in addition to differences in refractive indices between the modified layers 8 and the transparent material of the intercalary spaces 11, on the number of modified layers 8. Preferably, the screen 7 comprises at least 4 or 5 modified layers 8 in the propagation direction, and preferably at least 10 modified layers 8, or even preferably at least 20 modified layers 8.

It should be noted that the dimensions given above, and notably the distance Δ, depend on the wavelength of the light rays whereof the passage is sought to be blocked. In the case where the light rays have a plurality of wavelengths, it is possible to provide a plurality of sets of modified layers 8 each having configurations specific to a particular wavelength. It is sufficient, for example, to juxtapose these sets in the propagation direction 10. For example, when the transparent material is a PMMA of a refractive index of 1.51 and if the light is composed of light rays of two wavelengths 650 nm and 800 nm, the screen 7 may be composed of a first set of modified layers 8 separated by intercalary spaces 11 of a thickness of 108 nm, then a second set of modified layers 8 separated by intercalary spaces 11 of a thickness of 132 nm. The first set reflects the rays having a wavelength of 650 nm, then the second set reflects the rays having a wavelength of 800 nm.

The optical element 1 is characterized by its ease of manufacture, a method of which will now be described. The first step is to provide a block of material transparent to light, as previously described. As illustrated in FIG. 4, the diaphragm 5 is then made in the mass of the block of transparent material, by a femtosecond laser beam 20 scanning the transparent material at the locations of the modified layers 8. The femtosecond laser 20 emits laser pulses of very short durations, typically between 1 femtosecond ($10^{-15}$ s) and $5 \times 10^{-13}$ s. The scanning may be achieved by modifying the focusing of the femtosecond laser 20. Typically, the beam of the femtosecond laser 20 scans a first plane corresponding to the location of a first modified layer 8, then scans a second plane corresponding to the location of a second modified layer 8, and so on, scanning all the locations of the modified layers 8 one after the other. As mentioned earlier, it is possible to be satisfied with the thickness obtained after a single scan by the femtosecond laser 20. If it were wished to obtain thicker modified layers, e.g. for giving a modified layer 8 an optimum thickness allowing a Bragg diffraction, it is sufficient to perform a plurality of laser scans at adjacent locations to obtain a modified layer of the desired thickness.

The wavelength of the femtosecond laser 20 is chosen according to the transparent material whereof it is desired to locally modify the refractive index, along with the fluence of the laser or its pulse duration, in order to modify the refractive index of the transparent material into the modified index. For example, for a transparent material made of PMMA, a 200 nm femtosecond laser may be used. The very short duration laser pulses of the femtosecond laser 20 make it possible to affect the substance of the transparent material without inducing thermal effects therein. The more the modified index differs from the refractive index of the transparent material, the more effective the screen 7 of the diaphragm 5 will be. The parameters of the femtosecond laser 20 are therefore chosen to this end.

The optical element 1 is particularly suitable for producing a fingerprint sensor. Such a fingerprint sensor then comprises:

a light source suitable for emitting light,
an acquisition surface configured for receiving a finger,
an imager 9 configured for acquiring an image,
an optical element 1 as previously described, said optical element being arranged between the acquisition surface and the imager, so that the light originating from the acquisition surface and arriving on the imager passes through the diaphragm 5 of the optical element 1. The acquisition surface 2 may be a surface of the optical element 1, as illustrated in FIG. 2.

The invention is not restricted to the embodiment described and represented in the appended figures. Modifications remain possible, notably with regard to the constitution of the various technical features or by substituting technical equivalents, without departing from the scope of the protection afforded to the invention.

The invention claimed is:

1. A fingerprint sensor for acquiring biometric data comprising:
   an acquisition surface configured for receiving a finger,
   a light source suitable for emitting light to illuminate the finger received on the acquisition surface,
   an imager configured for acquiring an image of fingerprints of the finger received on the acquisition surface,
   wherein the fingerprint sensor comprises a one-piece optical element consisting of a material transparent to light, wherein said one-piece optical element comprises a diaphragm formed in the mass of said transparent material and within the one-piece optical element,
   wherein the diaphragm within the one-piece optical element comprises:
   an orifice of the diaphragm consisting of said transparent material, suitable for passage of light through said orifice in a propagation direction,
   a screen of the diaphragm consisting of said transparent material surrounding said orifice of the diaphragm, said screen of the diaphragm opposing passage of light therethrough and said screen of the diaphragm being formed by a succession of modified layers formed of the transparent material within the one-piece optical element in the propagation direction, said modified layers of the screen of the diaphragm separated from each other in the propagation direction by intercalary spaces within the one-piece optical element formed of the transparent material of the one-piece optical element, the modified layers of the transparent material of the screen of the diaphragm having a modified refractive index different from a refractive index of the transparent material in the rest of the one-piece optical element, wherein the refractive index of the transparent material constituting the intercalary spaces, the modified refractive index of the modified layers, and a distance separating the modified layers, are configured to cause light to be reflected in a direction opposite to the propagation direction, and
   wherein said one-piece optical element is arranged between the acquisition surface configured for receiving a finger and the imager for acquiring an image of fingerprints of the finger received on the acquisition surface, so that light originating from the acquisition surface and arriving on the imager passes through the diaphragm of the one-piece optical element.

2. The fingerprint sensor as claimed in claim 1, wherein the succession of modified layers forming the screen of the diaphragm within the one-piece optical element comprises at least four modified layers formed of the transparent material, preferably at least ten modified layers formed of the transparent material.

3. The fingerprint sensor as claimed in claim 1, wherein the modified layers formed of the transparent material within the one-piece optical element, and forming the screen of the diaphragm within the one-piece optical element, are separated in the propagation direction by a distance of between 10 nm and 200 nm.

4. The fingerprint sensor as claimed in claim 1, wherein the modified layers formed of the transparent material within the one-piece optical element, forming the screen of the diaphragm within the one-piece optical element, and separated from each other in the propagation direction constitute a Bragg mirror.

5. The fingerprint sensor as claimed in claim 1, wherein the orifice of the diaphragm within the one-piece optical element defines an entrance pupil with a diameter of between 0.5 mm and 2 mm.

6. The fingerprint sensor as claimed in claim 1, wherein the modified layers formed of the transparent material within the one-piece optical element, and forming the screen of the diaphragm within the one-piece optical element, extend from the orifice.

7. The fingerprint sensor as claimed in claim 6, wherein the modified layers formed of the transparent material within the one-piece optical element, and forming the screen of the diaphragm within the one-piece optical element, extend up to a surface of the optical element.

8. The fingerprint sensor as claimed in claim 1, also comprising at least one reflective face.

9. A method for manufacturing a fingerprint sensor for acquiring biometric data, said fingerprint sensor comprising:
an acquisition surface configured for receiving a finger,
a light source suitable for emitting light to illuminate the finger received on the acquisition surface,
an imager configured for acquiring an image of fingerprints of the finger received on the acquisition surface,
a one-piece optical element consisting of a material transparent to light, wherein said one-piece optical element comprises a diaphragm formed in the mass of said transparent material and within the one-piece optical element,
wherein the diaphragm within the one-piece optical element comprising:
an orifice of the diaphragm consisting of said transparent material, suitable for passage of light through said orifice in a propagation direction,
a screen of the diaphragm consisting of said transparent material surrounding said orifice of the diaphragm, said screen opposing passage of light therethrough and said screen of the diaphragm being formed by a succession of modified layers formed of the transparent material within the one-piece optical element in the propagation direction, said modified layers of the screen of the diaphragm separated from each other in the propagation direction by intercalary spaces within the one-piece optical element formed of the transparent material of the one-piece optical element, the modified layers of the transparent material of the screen of the diaphragm having a modified refractive index different from a refractive index of the transparent material in the rest of the one-piece optical element,
said method comprising:
providing a block of material transparent to light to form the one-piece optical element,
manufacturing the diaphragm within the block of material transparent forming the one-piece optical element by a femtosecond laser beam scanning the transparent material at the locations of the modified layers of the screen of the diaphragm, thereby modifying the refractive index of the transparent material into the modified index, wherein the refractive index of the transparent material constituting the intercalary spaces, the modified refractive index of the modified layers, and a distance separating the modified layers, are configured to cause light to be reflected in a direction opposite to the propagation direction,
arranging the one-piece optical element between the acquisition surface configured for receiving a finger and the imager for acquiring an image of fingerprints of the finger received on the acquisition surface, so that light originating from the acquisition surface and arriving on the imager passes through the diaphragm of the one-piece optical element.

\* \* \* \* \*